US012163269B2

(12) United States Patent
Park et al.

(10) Patent No.: US 12,163,269 B2
(45) Date of Patent: Dec. 10, 2024

(54) LAUNDRY TREATMENT MACHINE AND METHOD FOR CONTROLLING THE SAME

(71) Applicant: LG ELECTRONICS INC., Seoul (KR)

(72) Inventors: Junho Park, Seoul (KR); Junsung Kim, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 905 days.

(21) Appl. No.: 17/258,073

(22) PCT Filed: Jul. 5, 2019

(86) PCT No.: PCT/KR2019/008290
§ 371 (c)(1),
(2) Date: Jan. 5, 2021

(87) PCT Pub. No.: WO2020/009532
PCT Pub. Date: Jan. 9, 2020

(65) Prior Publication Data
US 2021/0189623 A1 Jun. 24, 2021

(30) Foreign Application Priority Data
Jul. 6, 2018 (KR) ........................ 10-2018-0079046

(51) Int. Cl.
*D06F 33/47* (2020.01)
*D06F 33/42* (2020.01)
(Continued)

(52) U.S. Cl.
CPC .............. *D06F 33/42* (2020.02); *D06F 33/47* (2020.02); *D06F 34/10* (2020.02); *D06F 37/30* (2013.01);
(Continued)

(58) Field of Classification Search
CPC ............. F04D 15/0245; F04D 15/0254; F04D 15/0066; F04D 25/06; D06F 39/08;
(Continued)

(56) References Cited

U.S. PATENT DOCUMENTS 10,113,260 B2 * 10/2018 Leany ..................... D06F 37/40
10,697,101 B2 * 6/2020 Cho ......................... H02K 9/06
(Continued)

FOREIGN PATENT DOCUMENTS

EP 2 423 368 A1 2/2012
EP 2 692 930 A1 2/2014
(Continued)

OTHER PUBLICATIONS

International Search Report (with English Translation) and Written Opinion dated Dec. 11, 2019 issued in Application No. PCT/KR2019/008290.

*Primary Examiner* — Benjamin L Osterhout
(74) *Attorney, Agent, or Firm* — KED & Associates LLP

(57) ABSTRACT

The present disclosure relates to a laundry treatment machine and a method for controlling the same. A pump motor may operate according to the steps of starting up the pump motor when operating or stopping the pump motor. Upon restarting, the pump motor may be controlled to start up after being on standby until the rotor stops, and therefore the pump may run normally even in case in which the pump repeatedly stops and runs, and the drainage performance may be improved and wash water may be drained by the operation of the pump regardless of the lift level.

13 Claims, 11 Drawing Sheets

(51) Int. Cl.

| | |
|---|---|
| ***D06F 34/10*** | (2020.01) |
| ***D06F 37/30*** | (2020.01) |
| ***D06F 39/08*** | (2006.01) |
| ***F04D 15/00*** | (2006.01) |
| ***F04D 15/02*** | (2006.01) |
| ***F04D 25/06*** | (2006.01) |
| *D06F 23/02* | (2006.01) |
| *D06F 23/04* | (2006.01) |
| *D06F 33/48* | (2020.01) |
| *D06F 103/18* | (2020.01) |
| *D06F 103/38* | (2020.01) |
| *D06F 103/42* | (2020.01) |
| *D06F 103/48* | (2020.01) |
| *D06F 105/08* | (2020.01) |
| *D06F 105/46* | (2020.01) |

(52) U.S. Cl.
CPC ......... *D06F 39/08* (2013.01); *F04D 15/0066* (2013.01); *F04D 15/0254* (2013.01); *F04D 25/06* (2013.01); *D06F 23/02* (2013.01); *D06F 23/04* (2013.01); *D06F 33/48* (2020.02); *D06F 37/304* (2013.01); *D06F 39/083* (2013.01); *D06F 2103/18* (2020.02); *D06F 2103/38* (2020.02); *D06F 2103/42* (2020.02); *D06F 2103/48* (2020.02); *D06F 2105/08* (2020.02); *D06F 2105/46* (2020.02); *F04D 15/0245* (2013.01); *F05D 2260/85* (2013.01); *F05D 2270/304* (2013.01); *F05D 2270/335* (2013.01); *F05D 2270/705* (2013.01)

(58) Field of Classification Search
CPC .......... D06F 34/10; D06F 33/47; D06F 33/42; D06F 37/30; D06F 2103/48; D06F 23/02; D06F 33/48; D06F 23/04; D06F 2103/42; D06F 2105/46; D06F 2103/38; D06F 2105/08; D06F 2103/18; D06F 39/083; D06F 37/304; F05D 2270/705; F05D 2270/304; F05D 2260/85; F05D 2270/335
See application file for complete search history.

(56) References Cited

U.S. PATENT DOCUMENTS

| | | | | |
|---|---|---|---|---|
| 2006/0101864 A1* | 5/2006 | Namkung | ............. | D06F 37/264 68/3 R |
| 2014/0069145 A1* | 3/2014 | Chupka | .................. | H02K 7/108 310/78 |
| 2014/0096327 A1* | 4/2014 | Lee | ......................... | D06F 34/18 68/12.05 |
| 2014/0184119 A1 | 7/2014 | Youm et al. | | |
| 2015/0128660 A1* | 5/2015 | Jung | ....................... | H02P 21/34 318/400.11 |
| 2015/0128661 A1* | 5/2015 | Jung | ....................... | D06F 34/10 318/400.11 |
| 2016/0108575 A1 | 4/2016 | Lee et al. | | |
| 2017/0047876 A1* | 2/2017 | Lee | ......................... | H02P 27/06 |
| 2017/0054394 A1* | 2/2017 | Jung | ....................... | H02P 27/06 |

FOREIGN PATENT DOCUMENTS

| | | | | |
|---|---|---|---|---|
| EP | 3660195 A1 * | 6/2020 | ............. | D06F 33/00 |
| JP | 2010-209918 A | 9/2010 | | |
| JP | 2012-040083 A | 3/2012 | | |
| JP | 2012-205625 A | 10/2012 | | |
| KR | 10-2014-0085098 A | 7/2014 | | |
| KR | 10-2016-0045405 A | 4/2016 | | |

* cited by examiner

LAUNDRY TREATMENT MACHINE AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2019/008290, filed Jul. 5, 2019, which claims priority to Korean Patent Application No. 10-2018-0079046, filed Jul. 6, 2018, whose entire disclosures are hereby incorporated by reference.

BACKGROUND OF THE DISCLOSURE

1. Field of the Disclosure

The present disclosure relates to a laundry treatment machine and a method for controlling the same, and more particularly, to a laundry treatment machine that allows a pump to run normally, and a method for controlling the same.

2. Description of the Related Art

A laundry treatment machine includes a drain pump to discharge water to the outside. A drain pump driving apparatus drives a motor during drainage to discharge water introduced into a water introduction part to the outside.

In order to drive the drain pump, the motor is normally driven by a constant speed operation with an input AC voltage.

For example, when the frequency of the input AC voltage is 50 Hz, the drain pump motor rotates at 3,000 rpm, and, when the frequency of the input AC voltage is 60 Hz, the drain pump motor rotates at 3,600 rpm.

Japanese Laid-Open Patent Publication No. 2004-135491 discloses speed control in response to a speed command in order to drive a motor.

It is often the case that the pump idles during drainage depending on the amount of water introduced into the pump. In case in which the pump idles, noise may be generated from the pump.

Meanwhile, the pump may repeatedly operate and stop operation depending on the operation of the main motor. When the pump stops, the speed of rotation of the pump motor in the pump slows down in response to a stop command, and stops rotation after a certain amount of time.

Although the pump with such a pump motor cannot be re-started immediately since it takes a certain amount of time for the pump motor to stop, it may be re-started within a short period of time after the pump stops operation.

In case in which the pump is started again before the pump motor is completely stopped, the pump motor cannot be properly aligned in position. Also, when the pump is stopped, the water remaining in the drain hose may flow back to the pump. In this case, the position of the pump motor is changed due to the remaining water.

Because of its sensorless motor characteristics, the pump motor does not operate normally due to the problem of position alignment of the pump motor, and cannot be controlled.

Accordingly, there is a need to configure the pump in such a way that the pump is not re-started while the pump motor is stopped for a certain amount of time.

SUMMARY

The present disclosure provides a laundry treatment machine capable of improving the success rate of start-up by starting up a pump after a certain amount of time when the pump is stopped, and a method for controlling the same.

The present disclosure also provides a laundry treatment machine capable of minimizing degradation of drainage performance according to installation conditions and a method for controlling the same.

The present disclosure also provides a laundry treatment machine capable of reducing drainage time and a method for controlling the same.

The present disclosure also provides a laundry treatment machine with a pump that is driven in a sensorless manner and a method for controlling the same.

An embodiment of the present disclosure provides a laundry treatment machine comprising: a main motor to supply torque to a washing tub; a pump motor to operate a pump; and a pump driving apparatus to drive the pump motor; and a main controller to control the pump motor to operate separately in a first period during which the pump motor stops, a second period, subsequent to the first period, during which the rotor of the pump motor is aligned, and a third period, subsequent to the second period, during which the speed of rotation of the pump motor is increased.

The third period comprises a period during which the speed of rotation of the pump motor increases with a first rising slope and a period during which the speed of rotation of the pump motor increases with a slope steeper than the first rising slope.

In case in which the speed of the pump motor does not reach a specified speed, the main controller stops the pump motor and then starts up the pump motor.

In the present invention, the operation of the pump motor is controlled by the steps for stopping the rotor of the pump motor, aligning the position of the rotor of the pump motor, initially starting up the pump motor, and maintaining the operation of the pump motor.

The main controller initiates the operation of the pump by starting up the pump motor after being on standby for a time corresponding to the first period.

The main controller detects the direction of rotation of the pump motor, stops the pump upon determining occurrence of a startup failure in case in which the pump motor does not rotate in a specified direction, and then restarts the pump.

Furthermore, in the present invention, the method comprises: initiating the operation of a pump; stopping the pump motor during a first period; aligning the rotor of the pump motor during a second period; increasing the speed of rotation of the pump motor and then increasing it again during a third period; and circulating or draining wash water by controlling the speed or power of the pump motor.

The method further comprises: increasing the speed of the pump motor with a first slope during the third period; and increasing the speed of the pump motor with a slope steeper than the first slope.

Advantageous Effects

A laundry treatment machine and a method for controlling the same according to an embodiment of the present disclosure may allow a pump to run normally during drainage even in case in which the pump is re-started after being stopped.

Particularly, the present disclosure allows a pump to run normally even in case in which the wash water remaining in a drain hose flows back when the pump is stopped.

Furthermore, the present disclosure may prevent malfunction or drainage error problems caused by a pump startup failure.

The present disclosure has the effect of improving drainage performance, preventing a time delay caused by a startup failure, and reducing drainage time since the pump is controlled to run normally even when it is re-started after being stopped.

The present disclosure may reduce the number of times of idling of the pump by controlling the operation of the pump based on changes in the amount of wash water dewatered from laundry depending on the speed of rotation of the main motor.

The present disclosure may improve drainage performance by varying the motor speed of the pump.

The present disclosure may reduce drainage time and wash time by improving the drainage performance of the pump.

Moreover, the present disclosure may reduce drainage noise as the number of times of idling of the pump is reduced.

The present disclosure may improve drainage performance since wash water is drained regardless of the lift level and the pump startup failure problem caused by the drain hose can be solved.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
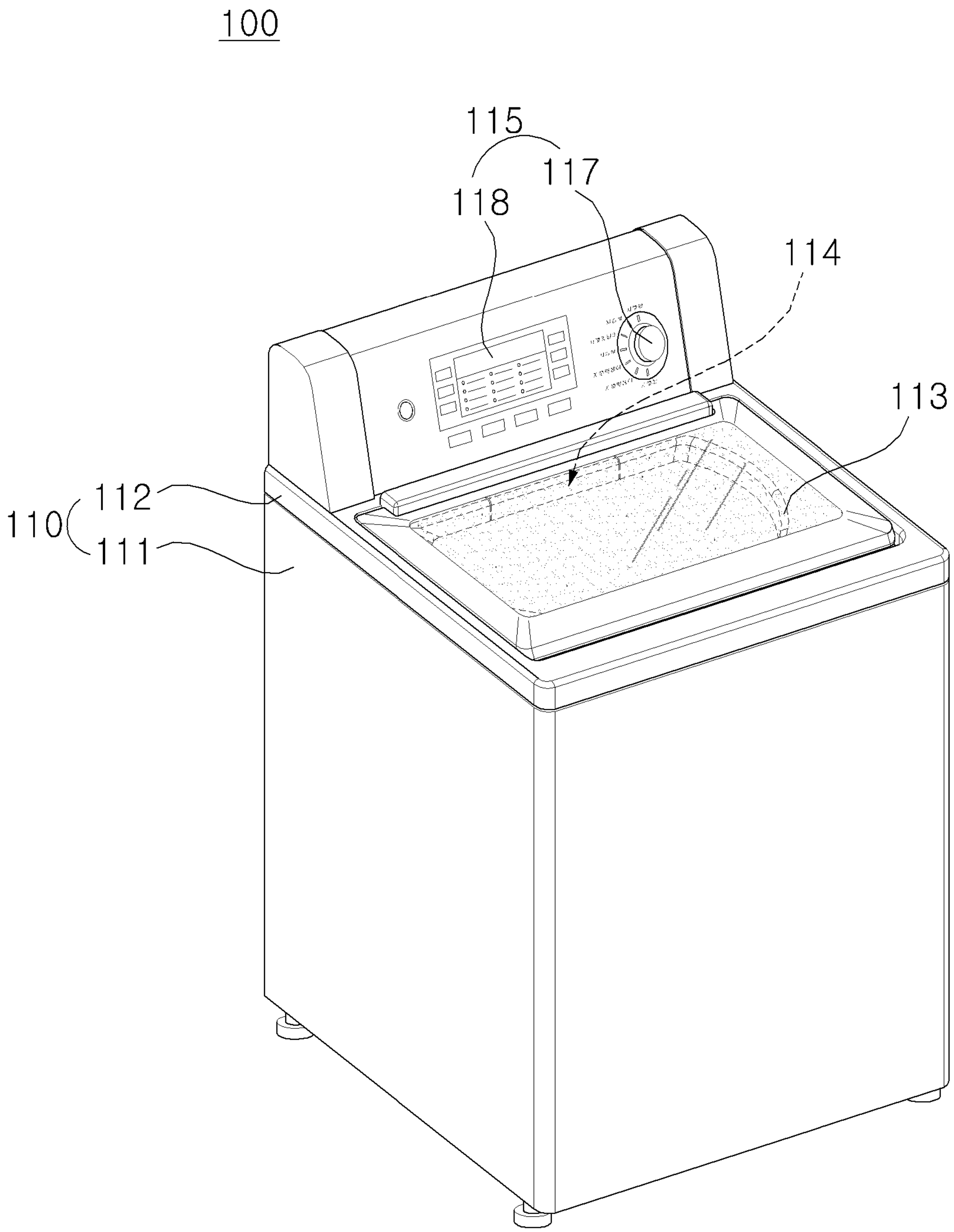
FIG. 1 is a perspective view illustrating a laundry treatment machine according to an embodiment of the present disclosure.
Figure 2:
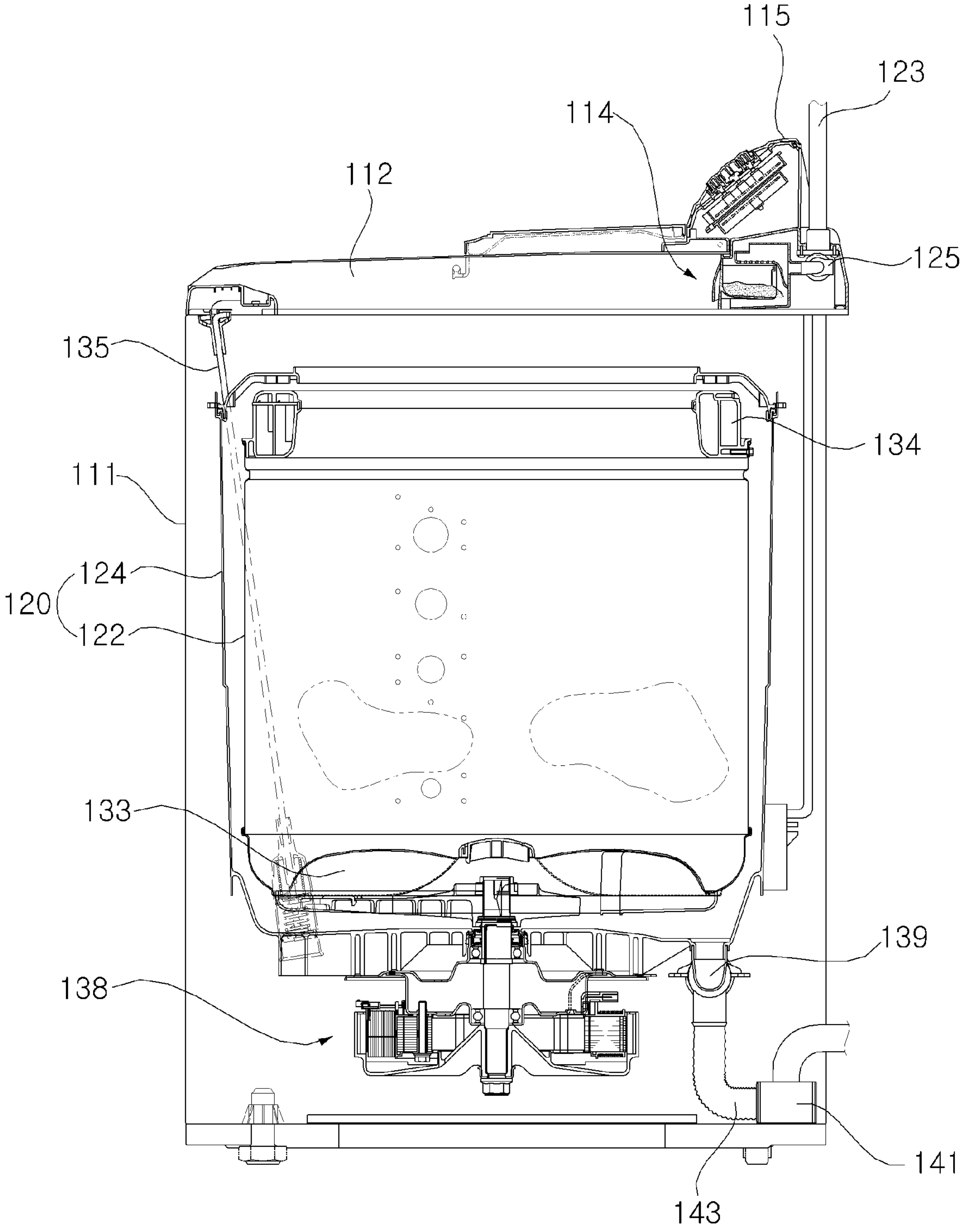
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
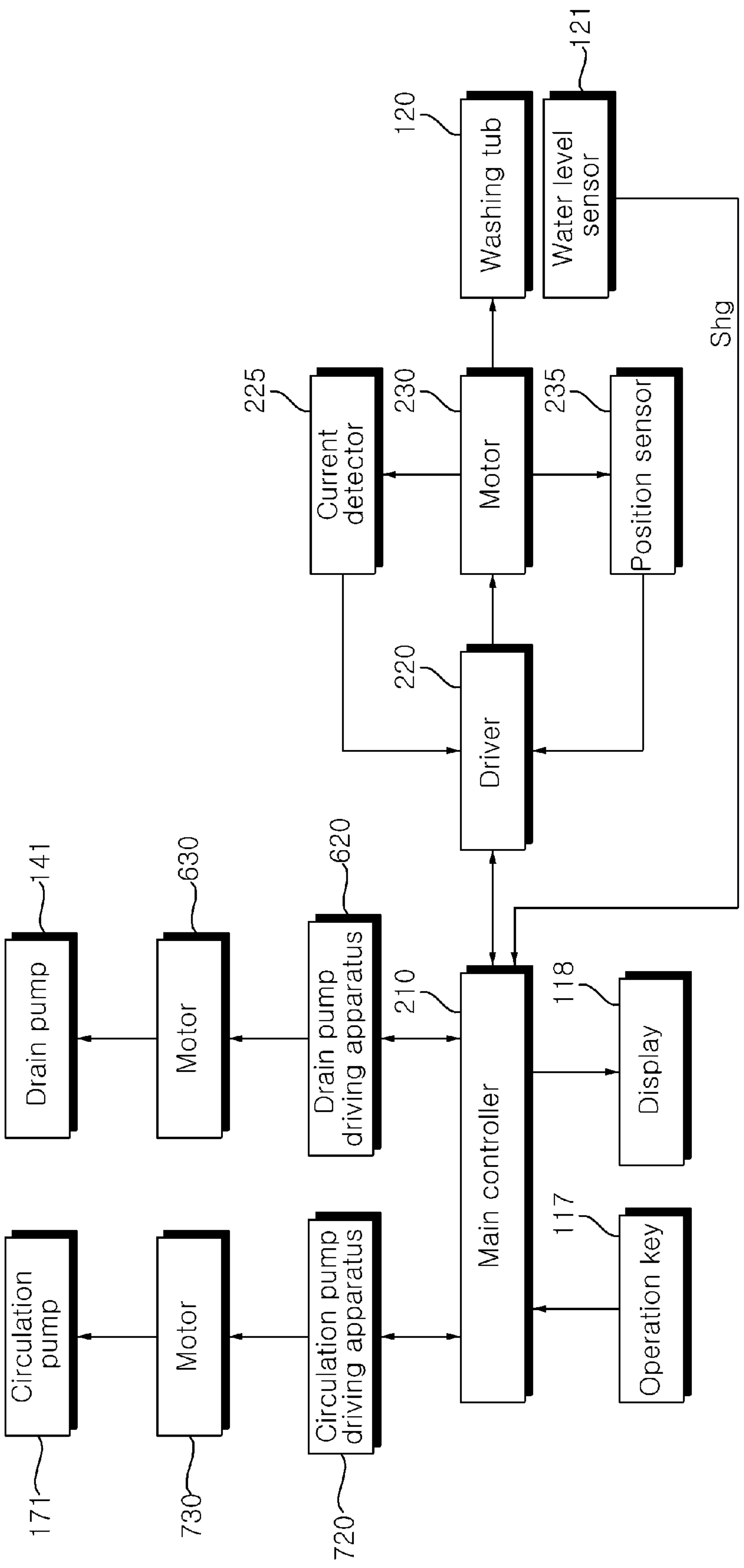
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a pump 141 for pumping the wash water may be provided.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry in the inner tub 122, the rotational speed of the inner tub 122 or the resonance characteristics of the inner tub 122 can be attenuated.

It should be noted that the present disclosure is described with respect to, but not limited to, a laundry treatment machine with a door formed on a top cover, and may be applied to a laundry treatment machine with a door formed on the front.

FIG. 3 is an internal block diagram of the laundry treatment machine of FIG. 1.

Referring to FIG. 3, in the laundry treatment machine 100, the driver 220 is controlled by the main controller 210, and the driver 220 drives the motor 230. Thereby, the washing tub 120 is rotated by the motor 230.

Meanwhile, the laundry treatment machine 100 may include a motor 630 for driving the pump 141 and a pump driving apparatus 620 for driving the motor 630. The pump driving apparatus 620 may be controlled by the main controller 210.

Also, the laundry treatment machine 100 may include a motor 730 for driving the circulation pump 171 and a circulation pump driving apparatus 720 for driving the motor 730. The circulation pump driving apparatus 720 may be controlled by the main controller 210.

In case in which necessary, the motor 230 for spinning the washing tub may be described as a main motor, the motor 630 for operating the drain pump may be described as a drain motor, and the motor 730 for operating the circulation pump may be described as a circulating motor.

In this specification, the pump driving apparatus 620 may be referred to as a pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the motor 230. For example, the main controller 210 may control the driver 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the motor 230, may include an inverter (not shown) and an inverter controller (not shown). In addition, the driver 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
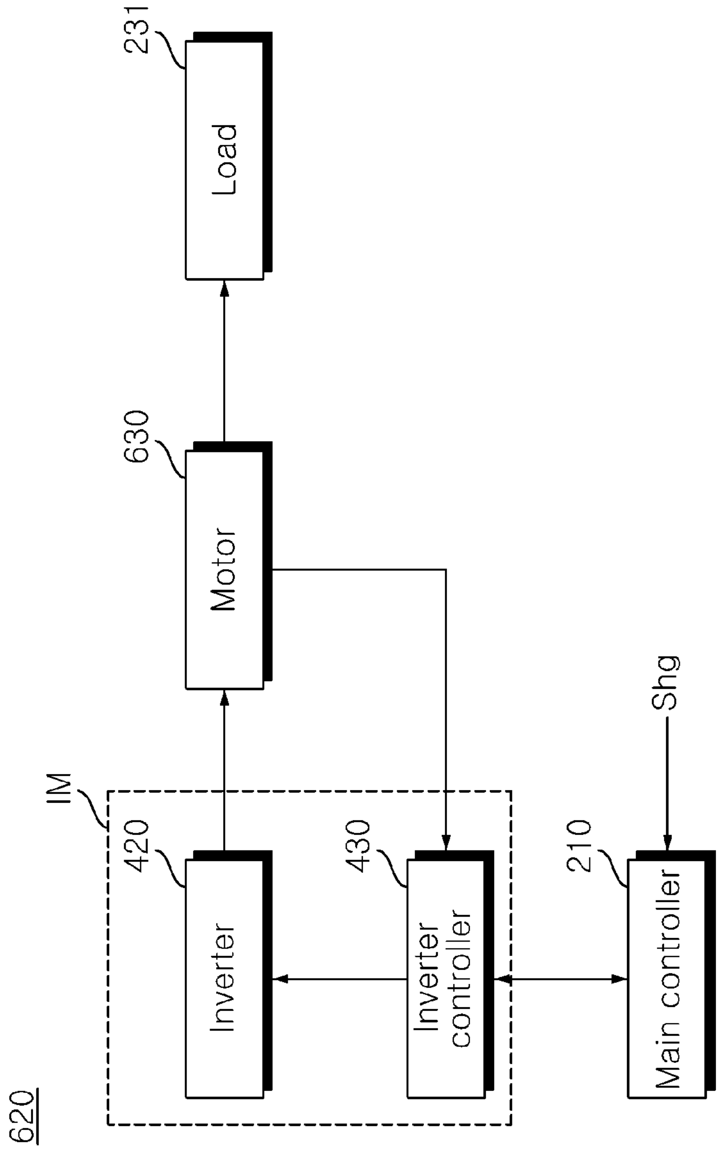
FIG. 4 illustrates an example of an internal block diagram of a pump driving apparatus of FIG. 1.
Figure 5:
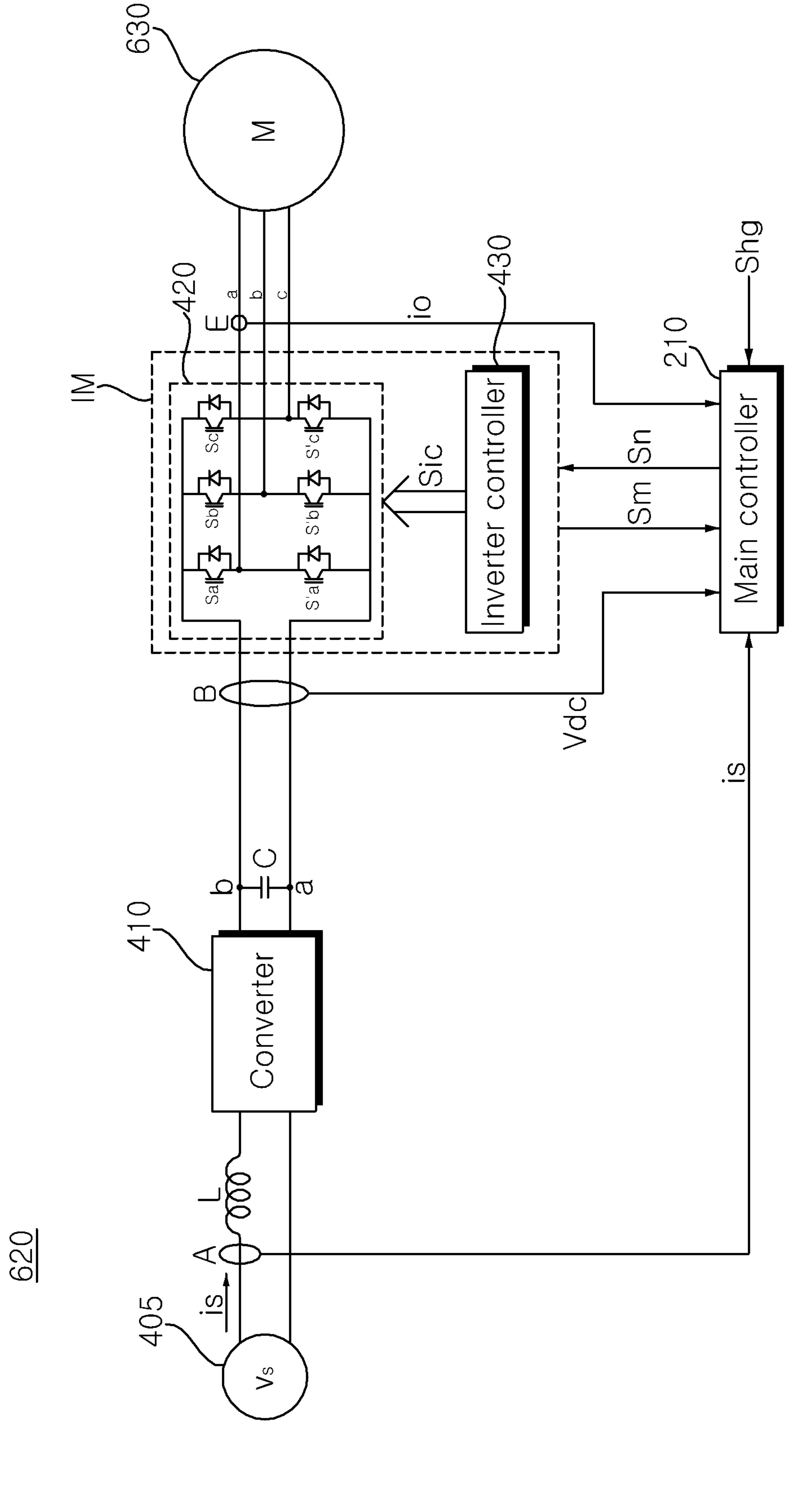
FIG. 5 illustrates an example of an internal circuit diagram of the pump driving apparatus of FIG. 4.

FIG. 4 illustrates an example of an internal block diagram of the pump driving apparatus of FIG. 1, and FIG. 5 illustrates an example of an internal circuit diagram of the pump driving apparatus of FIG. 4.

Referring to FIGS. 4 and 5, the pump driving apparatus 620 according to an embodiment of the present disclosure serves to drive the motor 630 in a sensorless manner, and may include an inverter 420, an inverter controller 430, and a main controller 210.

The main controller 210 and the inverter controller 430 may correspond to a controller and a second controller described in this specification, respectively.

The pump driving apparatus 620 according to an embodiment of the present disclosure may include a converter 410, a DC terminal voltage detector B, a DC terminal capacitor C, and an output current detector E. In addition, the pump driving apparatus 620 may further include an input current detector A and a reactor L.

The circulation pump 171 may be internally configured in the same manner as the drain pump, except for the hose connection, and operate on the same principle. A description of the configuration and operation of the circulation pump may be omitted below.

Hereinafter, an operation of each constituent unit in the drain pump driving apparatus 620 of FIGS. 4 and 5 will be described.

The reactor L is disposed between a commercial AC voltage source 405 (*vs*) and the converter 410, and performs a power factor correction operation or a boost operation. In addition, the reactor L may also function to limit a harmonic current resulting from high-speed switching of the converter 410.

The input current detector A may detect an input current is is input from the commercial AC voltage source 405. To this end, a current transformer (CT), a shunt resistor, or the like may be used as the input current detector A. The detected input current is is may be input to the inverter controller 430 or the main controller 210 as a discrete signal in the form of a pulse. In FIG. 5, it is illustrated that the detected input current is is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies depending on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed voltage. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous motor 630.

For example, when the synchronous motor 630 is in a 3-phase type, the inverter 420 may convert the DC voltage Vdc into 3-phase AC voltages va, vb and vc and output the 3-phase AC voltages to the three-phase synchronous motor 630 as shown in FIG. 5.

As another example, when the synchronous motor 630 is in a single-phase type, the inverter 420 may convert the DC voltage Vdc into a single-phase AC voltage and output the single-phase AC voltage to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current idc detected by the output current detector E and a DC terminal voltage Vdc detected by the DC terminal voltage detector B.

The main controller 210 may calculate a power based on the output current idc and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current idc flowing in the 3-phase motor 630.

The output current E may be disposed between the DC terminal capacitor C and the inverter 420 to detect an output current idc flowing in the motor.

Particularly, the output current detector E may have one shunt resistance element Rs.

Meanwhile, the output current detector E may use one shunt resistance element Rs to detect phase current ia, ib, and ic, which is the output current idc flowing in the motor 630, when the lower arm switching element of the inverter 420 is turned on.

The detected output current idc may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC voltage at a predetermined frequency for each phase is applied to a coil of the stator for each phase (phase a, b or c).

Such a motor 630 may include a brushless DC (BLDC) motor.

The motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
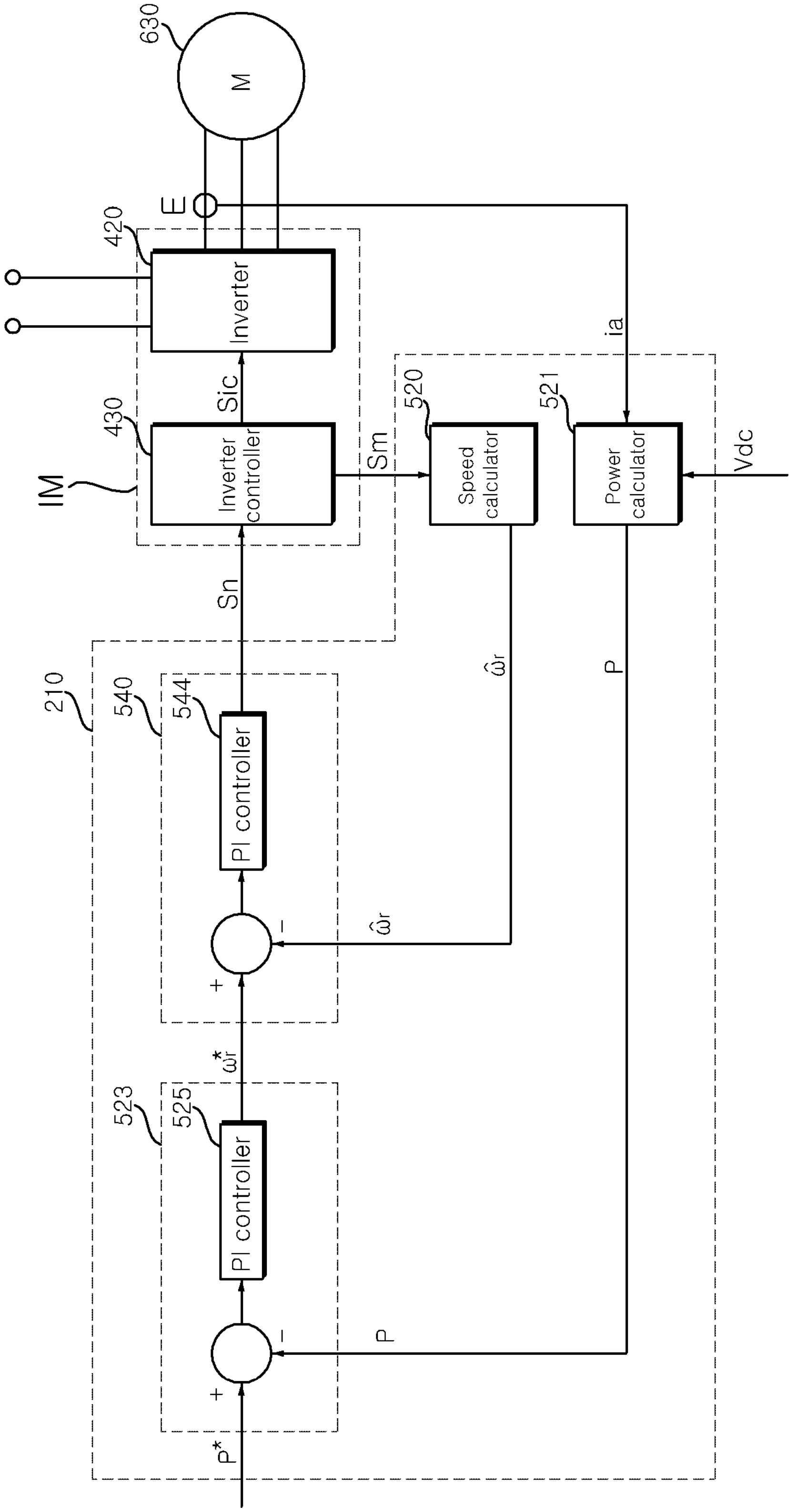
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the motor 630 received from the inverter controller 430.

Specifically, the speed calculator 520 may calculate a zero crossing for the voltage information Sm of the motor 630 received from the inverter controller 430, and calculate a speed of the drain motor 630 based on the zero crossing.

The power calculator 521 may calculate a power P supplied to the motor 630, based on the output current idc detected by the output current detector E and the DC terminal voltage Vdc detected by the DC terminal voltage detector B.

The power controller 523 may generate a speed command value ω*r based on the power P calculated by the power calculator 521 and a preset power command value P*r.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, the main controller 210 according to the embodiment of the present disclosure may control such that, during drainage, the motor 630 is driven with first power in case in which the lift, which is the difference between the level of water in a water introduction part introduced into the pump 141 and the level of water in a water discharge part discharged from the pump 141, is at a first level, and the motor 630 is driven with first power in case in which the lift is at a second level which is higher than the first level. Accordingly, water lifting can be done smoothly even in case in which the lift varies during drainage.

Particularly, since the power control allows for driving at constant power, the converter 410 supplies constant power, thereby improving the stability of the converter 410.

Meanwhile, the main controller 210 according to the embodiment of the present disclosure may control the speed of the motor 630 to be constant, in case in which the power supplied to the motor 630 reaches the first power. In this manner, the power control allows for minimizing a decrease in drainage performance according to installation conditions.

Meanwhile, the main controller 210 according to the embodiment of the present disclosure may control such that, when the speed of the motor 630 increases, a period during which the speed of the motor 630 increases includes an initial increase period and a second increase period during which the speed of the motor 630 increases more sluggishly than in the initial increase period. Particularly, the output current idc may be controlled to be constant during the second increase period. Accordingly, the motor 630 may operate at constant power.

Meanwhile, the main controller 210 according to the embodiment of the present disclosure may control such that, during drainage, the speed of the motor 630 increases as the level of the lift increases.

Meanwhile, the main controller 210 according to the embodiment of the present disclosure may control such that, during drainage, the amount of water lifted by the operation of the drain pump 141 decreases as the level of the lift increases.

Meanwhile, the main controller 210 according to the embodiment of the present disclosure may control such that, during drainage, the speed of the motor 630 increases as the level of water in the washing tub 120 decreases.

Meanwhile, the main controller 210 according to the embodiment of the present disclosure may control such that the reduction in the amount of water lifted by the operation of the drain pump 141 caused by the increase in the level of the lift is smaller in the power control of the motor 630 than in the speed control of the motor 630. Accordingly, the level of the lift that can be installed becomes higher as compared to the speed control, thereby increasing the degree of freedom of installation.

Meanwhile, during drainage, the main controller 210 according to the embodiment of the present disclosure may control the power supplied to the drain motor 630 to be constant without decreasing over time. Accordingly, the drainage time may be reduced.

Meanwhile, the main controller 210 according to the embodiment of the present disclosure may perform power control on the drain motor 630 at the start of drainage, and, when the remainder of the water is reached, may finish the power control. Accordingly, drainage operation may be performed efficiently.

The main controller 210 according to an embodiment of the present disclosure may control the voltage command value Sn and a duty of the switching control signal Sic to be greater as the output current idc is at a smaller level. Accordingly, the motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may control such that, during drainage, the speed of the drain motor 630 increases in case in which the power supplied to the motor 630 does not reach the first power and the speed of the drain motor 630 decreases in case in which the power supplied to the motor 630 exceeds the first power. Accordingly, since the power control allows for driving at constant power, the converter supplies constant power, thereby improving the stability of the converter. Also, the power control allows for minimizing a decrease in drainage performance according to installation conditions.

Meanwhile, the main controller 210 according to another embodiment of the present disclosure may control the speed of the motor 630 to be constant, in case in which the power supplied to the motor 630 reaches the first power. In this manner, the power control allows for minimizing a decrease in drainage performance according to installation conditions.

Meanwhile, the main controller 210 according to another embodiment of the present disclosure may control such that, during drainage, the speed of the motor 630 increases as the level of the lift, which is the difference between the level of water in a water introduction part introduced into the drain pump 141 and the level of water in a water discharge part discharged from the drain pump 141, increases. Accordingly, water lifting can be done smoothly even in case in which the lift varies during drainage. Particularly, the power control allows for minimizing a decrease in drainage performance according to installation conditions.

Meanwhile, the main controller 210 according to another embodiment of the present disclosure may control such that, during drainage, the speed of the motor 630 increases as the level of water in the washing tub 120 decreases. Accordingly, water lifting can be done smoothly even in case in which the lift varies during drainage.

Figure 7:
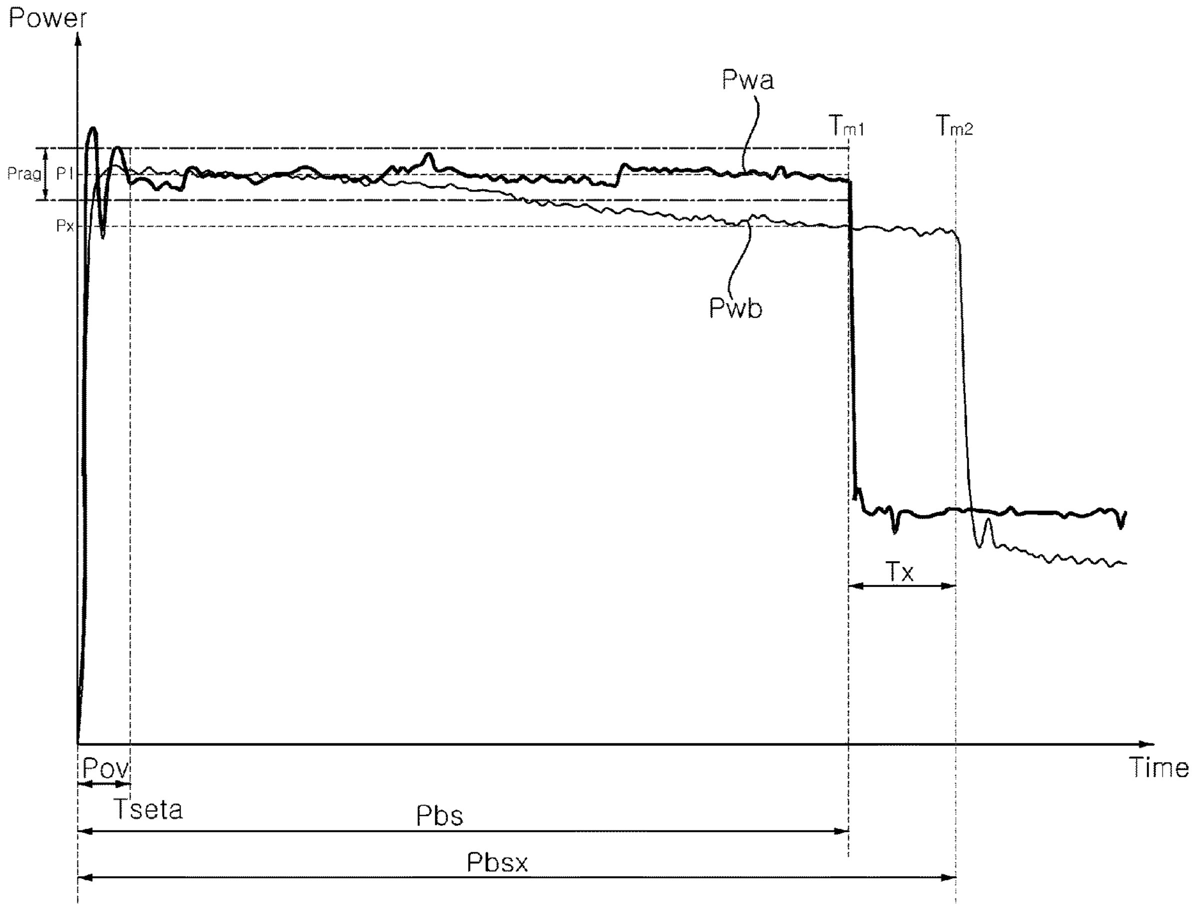
FIG. 7 is a view referred to in the description of a method for operating a pump driving apparatus.

FIG. 7 is a view showing power supplied to a motor according to power control and speed control.

When the power control is performed as in the embodiments of the present disclosure, a time-dependent waveform of the power supplied to the motor 630 may be exemplified as Pwa.

FIG. 7 illustrates that the power is maintained in a substantially constant manner until time point Tm1 by performing the power control, and the power control is terminated at time point Tm1.

By performing the power control, the main controller 210 may control the power supplied to the motor 630, during the drainage, to be constant without decreasing over time, although the water level in the washing tub 120 decreases.

By performing the power control, the main controller 210 may control the power supplied to the motor 630, during the drainage, to be the first power P1.

In particular, even in case in which the lift is changed, the main controller 210 may control the power supplied to the motor 630, during the drainage, to be the constant first power P1, by performing the power control.

At this time, the constant first power P1 may mean that the motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the motor 630 is driven with a power within the first allowable range Prag based on the first power P1 from time point Tseta until time point Tm1 when the drainage is completed, excluding an overshooting period Pov. Accordingly, water pumping can be performed smoothly even in case in which the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a first level, the main controller 210 may control the motor 630 to be driven with a power within the first allowable range Prag based on the first power P1, without decreasing over time, from first time point Tseta after the drainage is started until time point Tm1 when the drainage is completed, and when the lift is at a second level, the main controller 210 may control the motor 630 to be driven with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current idc and the DC terminal voltage Vdc and output a voltage command value Sn based on the calculated power, and the inverter controller 430 may output a switching control signal Sic to the motor 630 based on the voltage command value Sn.

Meanwhile, the main controller 210 may control the voltage command value Sn and a duty of the switching control signal Sic to be greater as the output current idc is at a smaller level. Accordingly, the motor 630 can be driven with a constant power.

Meanwhile, the main controller 210 may control the speed of the motor 630 to increase as the level of the lift increases. Accordingly, water lifting can be done smoothly even in case in which the lift varies during drainage. Particularly, the power control allows for minimizing a decrease in drainage performance according to installation conditions.

Meanwhile, the main controller 210 may control such that, during drainage, the speed of the motor 630 increases as the level of water in the washing tub 120 decreases. Accordingly, water lifting can be done smoothly even in case in which the lift varies during drainage.

Unlike the embodiments of the present disclosure, when the speed control is performed, that is, when the speed of the drain motor 630 is controlled to be maintained constantly, a time-dependent waveform of the power supplied to the motor 630 may be exemplified as Pwb.

In the drawing, it is illustrated that the speed control is performed until time point Tm2, and the speed control is terminated at time point Tm2.

The waveform Pwb of the power based on the speed control indicates that the power supplied to the motor 630 may be gradually reduced, while the speed of the motor 630 is constant, as the water level in the washing tub decreases during the drainage.

In FIG. 7, it is illustrated that, during a speed control period Pbsx, the power supplied to the motor 630 is gradually reduced up to approximately Px at time point Tm2 when the drainage is completed.

Accordingly, the time when the operation of the motor 630 is terminated in a case where the speed control is performed is Tm2, which is delayed approximately by the period Tx, when compared to that in a case where the power control is performed.

Consequently, according to the embodiment of the present disclosure, the drainage time is reduced approximately by the period Tx when power control is performed, as compared to when speed control is performed. Moreover, the power supplied from the converter 410 may be kept constant, thereby improving the operational stability of the converter 410.

Meanwhile, the operations of the pump driving apparatus and pump motor according to the present disclosure may apply equally to the circulation pump, as well as the drain pump and the drain pump.

The drain pump driving apparatus 620 according to the embodiment of the present disclosure may be applied to various machines such as dishwashers and air conditioners, in addition to the laundry treatment machine 100 and 100*b*.

Figure 8:
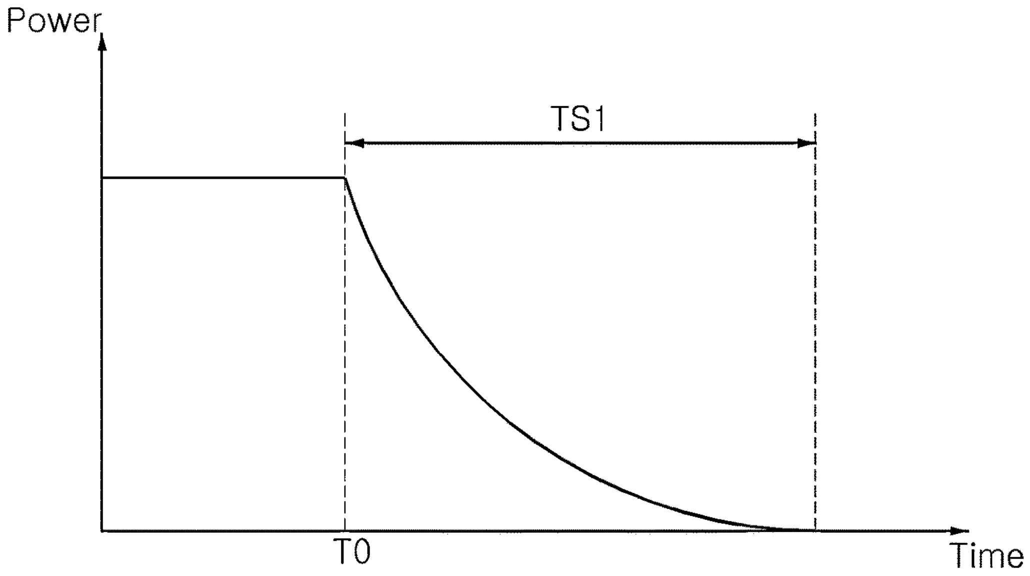
FIG. 8 is a view illustrating changes in speed caused by stopping a pump in a laundry treatment machine according to an embodiment of the present disclosure.

FIG. 8 is a view illustrating changes in speed caused by stopping a pump in a laundry treatment machine according to an embodiment of the present disclosure.

Referring to FIG. 8, the pump driving apparatus controls the operation of the pump by stopping the pump motor.

The pump motor stops operation as the speed of rotation decreases gradually upon receiving (TO) an operation stop command from the pump driving apparatus.

The current applied to the pump motor also decreases in response to the decrease in the speed of rotation of the pump motor.

It takes a given amount of time TS1 for the pump motor to stop operation in response to the operation stop command. The time to the stopping of the motor is about 800 to 900 ms, which may vary depending on the characteristics of the pump motor.

Upon receiving a restart command before the pump motor stops operation, the main controller allows the pump motor to operate after being on standby for a certain amount of time. The main controller delays the restarting of the pump until the pump motor completely stops operation.

After the operation stop command, the main controller may determine whether the pump motor is completely stopped based on the current of the pump motor or the speed of the pump motor.

The main controller may control the pump motor to restart when the pump motor is stopped. The pump driving apparatus allows the pump motor to operate by applying a current when the pump motor stops operation. The pump motor operates at a set speed by the current applied from the pump driving apparatus.

The main controller 210 determines whether the pump is operating normally, by controlling the pump motor for each period, and controls the pump motor according to speed or power in case in which it is operating normally.

Moreover, the main controller 210 may determine whether the pump rotates in a particular direction based on the direction of rotation of the pump. In case in which there are differences in the amount of wash water drained depending on the position of the flow channel of the pump and the direction thereof, the pump may be stopped and re-started even in case in which it is operating normally, unless it rotates in the specified direction.

Figure 9:
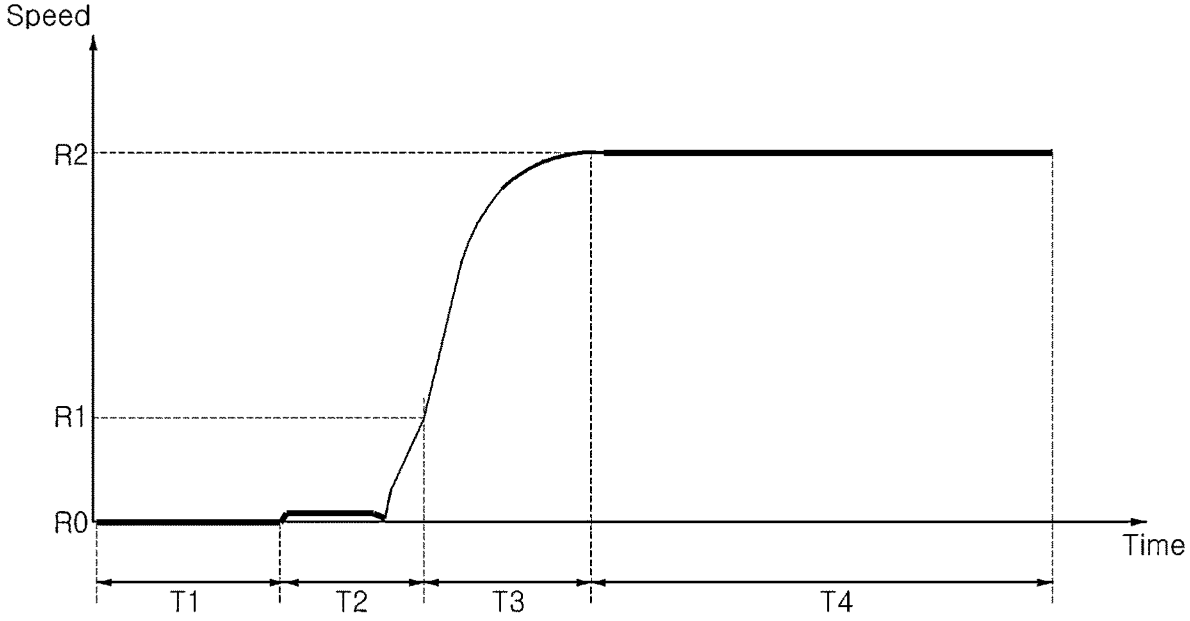
FIG. 9 is a view illustrating changes in speed for each stage of the operation of the pump in a laundry treatment machine according to an embodiment of the present disclosure.

FIG. 9 is a view illustrating changes in speed for each stage of the operation of the pump in a laundry treatment machine according to an embodiment of the present disclosure.

Referring to FIG. 9, the pump driving apparatus controls the pump motor in stages.

In case in which the pump is set to stop operation, the pump driving apparatus stops the operation of the pump motor. The main controller allows the pump motor to be on standby for a first period D21 to prevent the pump motor from restarting until it is completely stopped. The pump driving apparatus stops the rotor of the pump motor during the first period D21.

In case in which the pump is started after being stopped during drainage, the main controller controls the pump separately in a first period during which the pump motor is stopped at a point in time when the pump operation is initiated, a second period during which the position of the rotor of the pump motor is aligned, and a third period during which the speed of the pump motor increases. The first period is a period during which the pump motor is completely stopped in case in which the rotor of the pump motor is still operating by the above operation of the pump motor.

A sixth period during which the speed of the pump motor slows down and stops may be provided before the first period.

The first period is set longer than the second period. The first period is set longer than the third period. Also, the first period is set shorter than the sum of the second period and the third period. The sixth period may be set longer than the second period. The third period may be set longer than the sixth period.

The pump driving apparatus starts up the pump motor in response to a control command from the main controller.

In case in which the pump stops operation and then starts up during drainage, the pump driving apparatus is on standby to keep the pump motor from starting up during the first period D21. The pump driving apparatus does not run the pump motor even in case in which a startup command is received during the first period, but runs the pump motor after being on standby for the first period.

Preferably, the first period D21 is set longer than the above-explained given amount of time TS1. For example, the first period may be set to about two seconds. Also, the duration of the first period may change depending on the lift level of the drain hose. The rotor of the motor may be moved by the wash water introduced into the drain pump from the drain hose when the pump is stopped. Also, the time for stopping the rotor may be changed since the amount of wash water flow introduced into the drain pump from the drain hose changes with the lift level.

However, in a case where the pump motor stops operation and a startup command is inputted after the pump motor is stopped for the duration of the first period, the pump motor may be started without a standby period. The pump driving apparatus may control the pump motor immediately from the second period D22 without passing through the first period D21.

In a case where the pump motor is run without the rotor being stopped, the position of the rotor is unstable, and therefore the pump motor cannot be controlled normally. Accordingly, the main controller controls the pump driving apparatus to be on standby for the first period which is set to make the rotor stop. AS explained previously in FIG. 8, it takes a certain amount of time TS1 for the pump motor to stop operation in response to a stop command. Therefore, the pump driving apparatus may set the first period to stop the rotor of the pump motor.

Once the rotor of the pump motor is stopped in response to a control command from the main controller, the pump driving apparatus aligns the position of the rotor of the pump motor during the second period D22 (Aline). At this point, the pump motor is run to adjust the position of the rotor of the pump motor, and therefore the applied current increases and the pump motor may be rotated at a certain angle to adjust the position of the rotor.

Once the alignment (Aline) of the rotor is completed, the pump driving apparatus initially starts up the pump motor during the third period D23 (Open Loop). The pump driving apparatus may apply a current to the pump motor to rotate it at a low speed, i.e., a first speed R1 for the initial startup.

During the second period D22 and the third period D23, the pump driving apparatus may allow the second period and the third period to continue for about 0.3 to 0.35 seconds in order to ensure the stability of control of the sensorless-type pump motor. The durations of the second period and third period may change depending on the configuration of the pump driving apparatus for driving the pump motor or the characteristics of the pump motor.

The pump driving apparatus may initially start up the pump motor during the third period D23, and therefore the speed of rotation of the pump motor increases.

After the initial startup, the pump driving apparatus allows the pump motor to speed up to a set speed and maintains the set speed during a fourth period D24. The fourth period may continue for about 1 second.

The third period and fourth period during which the speed increases may be set as a single period.

The pump motor speeds up from the first speed R1, and maintains the speed once the second speed R2 is reached. During the fourth period D24, the pump driving apparatus may detect impurities based on the speed and current of the pump motor and determine a startup failure.

The pump driving apparatus applies a current to the pump motor and controls the pump motor to speed up to the second speed R2. Accordingly, the speed of rotation of the pump motor increases up to the second speed.

The pump driving apparatus initially starts up the pump motor during the third period D23 and then runs the pump motor during the fourth period D23 by setting up the second speed as a target speed (Close Loop).

During the fourth period D24, the pump driving apparatus determines whether the pump motor reaches the second speed R2, which is the target speed, within a set period of time, to detect the presence of impurities and whether the pump motor is operating normally or not.

In case in which the speed of the pump motor does not reach the second speed R2 within a set period of time, the pump driving apparatus may determine that there are impurities in the pump motor or the pump motor is not operating normally. For example, the second speed R2 may be set to about 2,400 to 2,800 rpm.

In case in which the second speed is not reached within a set period of time or the current is increased to a certain value or above, the pump driving apparatus may determine this as a startup failure. In this case, the pump driving apparatus may restart the pump motor by stopping the pump motor and then repeating the above period.

In case in which it is determined that the pump motor is operating normally, the pump driving apparatus maintains the speed of the pump motor for a certain period of time (D25), and may control the speed of the pump motor according to the speed of the main motor, the water level, or the mode set for the pump.

Figure 10:
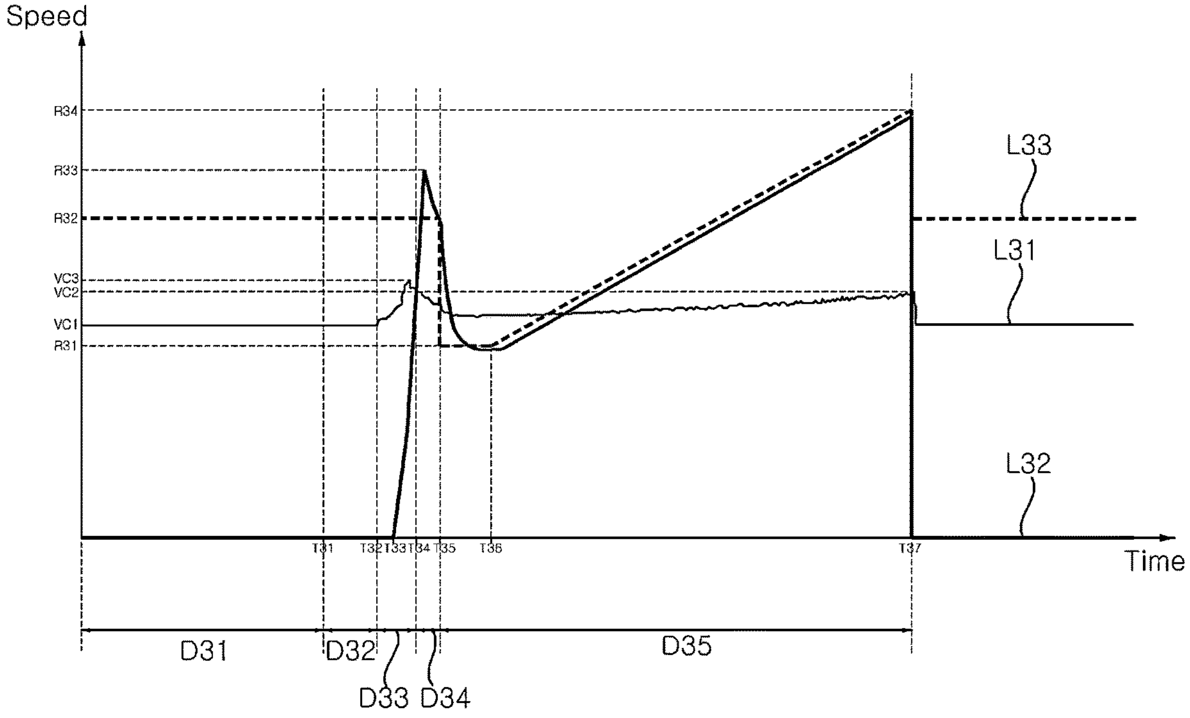
FIG. 10 is a view illustrating changes in speed and power for each step of the operation of the pump of FIG. 9.

FIG. 10 is a view illustrating changes in speed and power for each step of the operation of the pump of FIG. 9.

Referring to FIG. 10, the main controller may control the startup of the pump motor separately for the first to fourth periods by controlling the pump driving apparatus.

The pump motor operates separately for a first period D31 for stopping the rotor, a second period D32 for aligning the position of the rotor, a third period D33 during which the pump motor is started and increases its speed, and a fourth period D34 during which the pump motor maintains the speed after increasing its speed.

In the fourth period D34, the main controller may determine whether the pump motor is operating normally or not. The respective periods correspond to the first to fourth periods explained with reference to FIG. 8.

Afterwards, the pump driving apparatus controls the speed of the pump motor in response to a control command from the main controller according to the draining or dewatering operation of the laundry treatment machine in the fifth period D35.

The first graph L31 shows the output power of the pump motor, and the second graph L32 shows the speed of the pump motor.

In the first period D21 and D31 and the second period D22 and D32, the pump driving apparatus controls such that the pump motor does not operate during the first period and aligns the position of the rotor of the pump motor during the second period. Accordingly, the pump motor does not actually rotate but remains stopped.

In the third period D23 and D33, the pump driving apparatus applies a current to the pump motor to initially start it up. The pump motor increases its speed by means of the pump driving apparatus. For example, the pump motor may increase its speed to the first speed R1. As the voltage of the pump motor increases, the power also increases. Moreover, the pump motor increases its speed up to a thirty-second speed R32 in the fourth period D34. The thirty-second speed R32 may be set to the same value as the second speed.

The speed of the pump motor increases up to the thirty-second speed R32 and is maintained. In some cases, the speed of the pump motor may increase to above the thirty-second speed, and the pump driving apparatus controls the pump motor to operate at the thirty-second speed.

By the control of the pump driving apparatus, the pump driving apparatus determines whether the pump motor is operating normally based on changes in the speed of the pump motor in the fourth period D34. The pump driving apparatus may determine whether the pump motor is operating normally, based on whether the specified speed is reached within a set period of time.

The speed increases with a first rising slope in the third period, and the speed increases with a second slope steeper than the first rising slope. In the third period and fourth period, the speed of the pump motor increases but at different speeds.

In case in which it is determined that the pump motor is operating normally in the fourth period D34, the pump driving apparatus controls the pump motor in response to at least one of the speed of the main motor, the water level, and the mode of the pump in the fifth period D35.

The pump driving apparatus controls such that the speed increases from the thirty-first speed R31 according to the mode settings of the pump, and therefore the speed of the pump motor decreases and then increases. By the control of the pump driving apparatus, the output power of the pump motor increases, and therefore the speed of the pump motor increases. The pump driving apparatus controls the speed and power of the pump motor.

Meanwhile, in the third period, the power of the pump motor may be controlled to be constant. By controlling the power to be constant, the current may increase in case in which the DC voltage of the pump motor increases, and the current may increase in case in which the voltage decreases. Accordingly, it is possible to prevent drainage performance from decreasing by controlling the power to be constant.

By controlling the speed of the drain motor 630 to be maintained constant, the power supplied to the motor 630 may decrease over time. During drainage, as the water level of the washing tub decreases, the speed of the motor 630 is kept constant but the power supplied to the motor 630 may be sequentially lowered.

Moreover, the main controller 210 may control such that the speed of the motor 630 increases as the water level in the washing tub 120 decreases during drainage. Accordingly, even in case in which the water level in the washing tub 120 is lowered during drainage, water lifting may be performed smoothly.

Consequently, according to the embodiment of the present disclosure, the drainage time is reduced approximately by the period Tx when power control is performed, as compared to when speed control is performed. Moreover, the power supplied from the converter 410 may be kept constant, thereby improving the operational stability of the converter 410.

Figure 11:
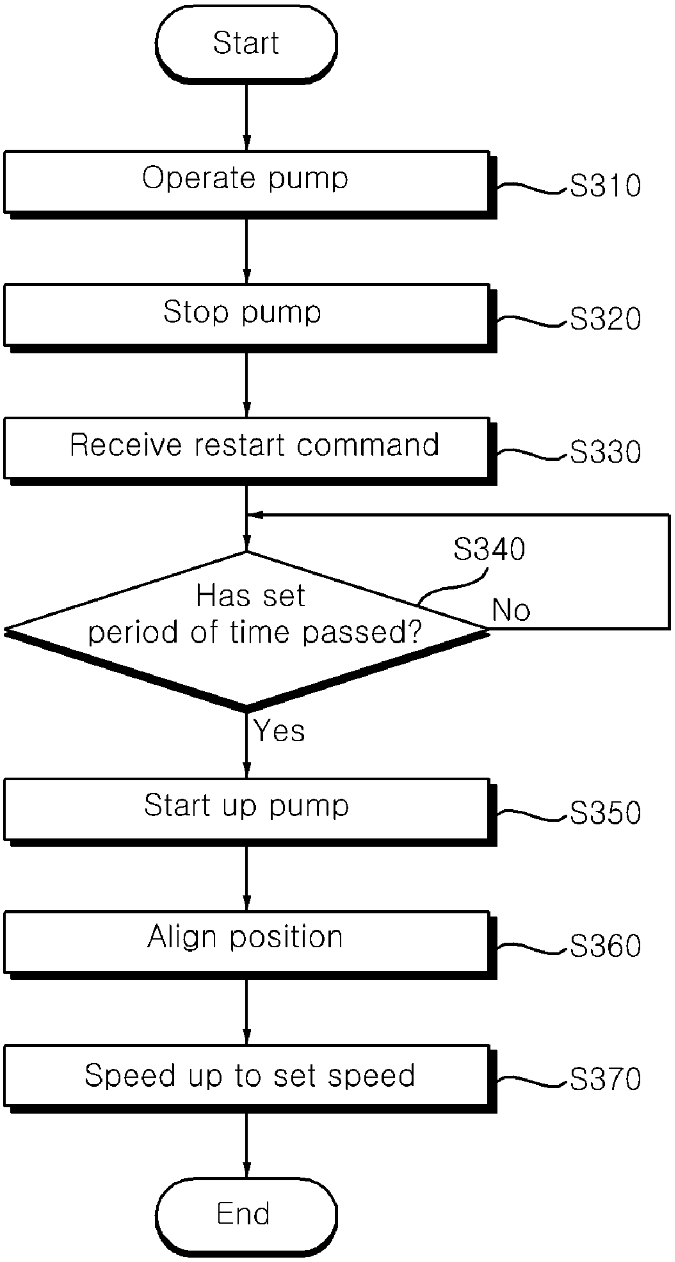
FIG. 11 is a sequential chart illustrating a method for controlling a pump for each step of the operation of the pump, in a laundry treatment machine according to an embodiment of the present disclosure.

FIG. 11 is a sequential chart illustrating a method for controlling a pump for each step of the operation of the pump, in a laundry treatment machine according to an embodiment of the present disclosure.

Referring to FIG. 11, the pump may operate in each step of wash and rinse cycles and drains wash water from the washing tub.

The pump driving apparatus controls the operation of the pump by operating or stopping the pump motor with respect to at least one of the speed of the main motor, the water level, and the mode of the pump. The pump driving apparatus may control the speed and power of the pump motor.

As the pump motor starts up, the pump is run to drain wash water (S310).

The pump driving apparatus may stop the pump motor during the operation of the pump and stop the operation of the pump (S320).

For example, the operation of the pump may be stopped during dewatering depending on the speed of the main motor or the water level. For example, in case in which the water level is below a set water level, or in case in which the main motor is speeding up, or in case in which the pump is set to stop operation after operating for a set period of time according to the pump mode, the pump driving apparatus may stop the operation of the pump by stopping the pump motor.

Upon receiving a restart command (S330) after stopping the pump motor, the pump driving apparatus determines whether the rotor of the pump motor is stopped or not. In this case, the pump driving apparatus determines whether a set period of time has passed after a stop command from the pump motor (S340) to determine whether the rotor of the pump motor is stopped or not. The set period of time corresponds to the first period.

The pump driving apparatus controls such that the pump motor In case in which a set period of time has not passed after the pump motor is stopped, and such that the pump motor is run after the set period of time (S350).

The pump driving apparatus aligns the position of the rotor of the pump motor (S360), and runs the pump motor to speed it up to a set speed after the initial startup (S370). The speed of the pump motor increases up to the set speed, and is maintained at the set speed. At this point, the pump driving apparatus may determine whether the pump motor is operating normally or not.

Figure 12:
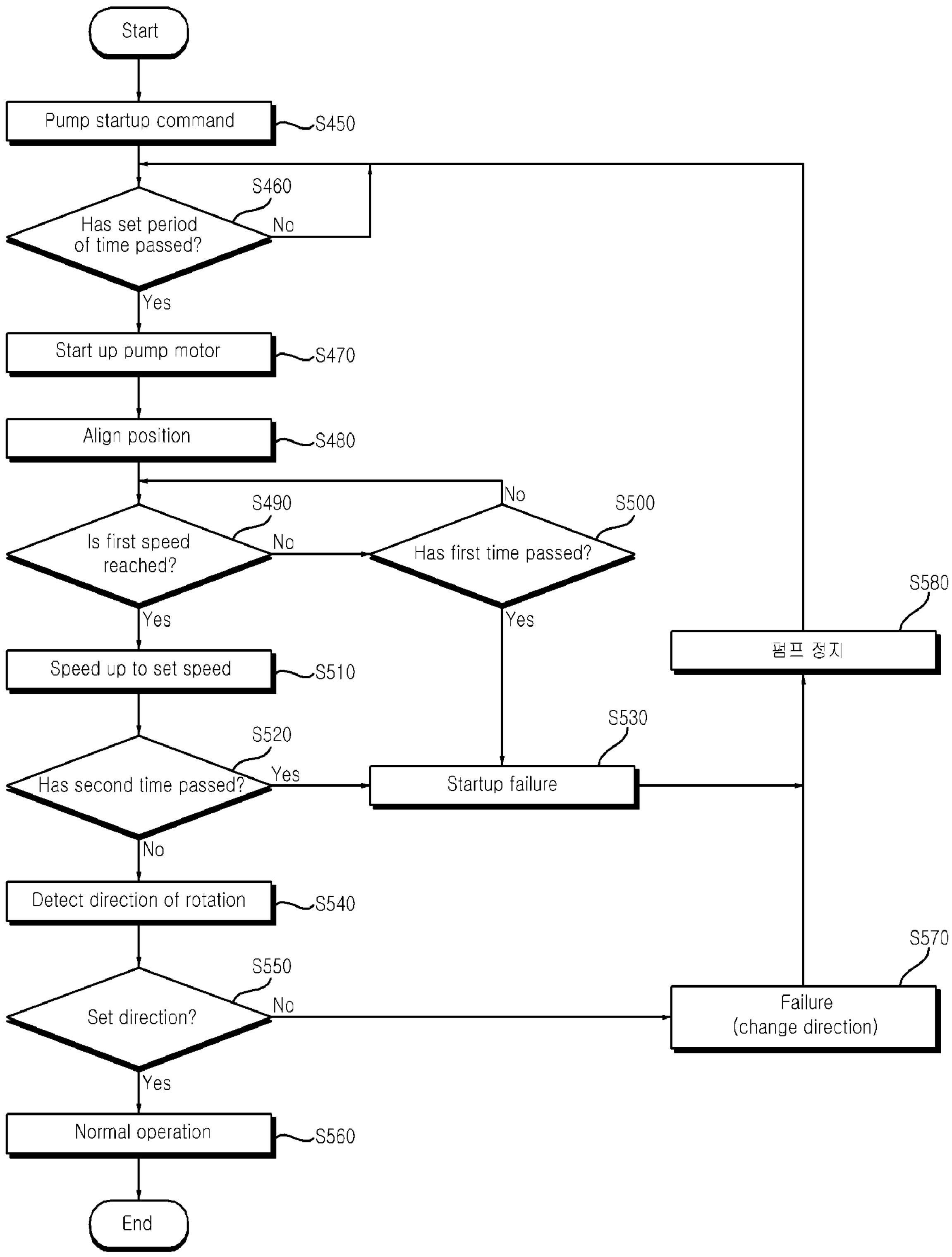
FIG. 12 is a sequential chart illustrating a method for controlling a pump in a laundry treatment machine according to an embodiment of the present disclosure.

FIG. 12 is a sequential chart illustrating a method for controlling a pump in a laundry treatment machine according to an embodiment of the present disclosure.

Referring to FIG. 12, upon receiving a pump startup command (S450), the pump driving apparatus is on standby for a set period of time until the rotor of the pump motor is stopped (S460), and then allows the pump motor to operate (S470). In some cases, in case in which the set period of time has passed while the pump motor is stopped, the pump motor may be started up immediately.

The pump driving apparatus aligns the position of the rotor of the pump motor (S480), and allows the pump motor to initially start up. The pump driving apparatus applies a current to the pump motor and allows the pump motor to operate.

The pump driving apparatus determines whether the pump motor reaches a first speed R1 and R33 after the initial startup (S490), and once the first speed is reached, determines whether the pump motor is operating normally.

In case in which the first speed is not reached, it is determined whether a preset first time has passed or not until the first speed is reached (S500).

In case in which the first speed is not reached within the first time, it is determined that an initial startup failure has occurred (S530), stops the pump (S580), and the restart it.

Upon restarting, the pump motor is not operated immediately but is on standby for a set period of time, and the position of the rotor is aligned after the rotor of the pump motor is stopped, and then the pump motor initially starts up.

Meanwhile, in case in which the first speed is reached within the first time, the pump driving apparatus determines that the initial startup is completed, and speeds up the pump motor until the set speed is reached (S510).

The pump driving apparatus compares the time (maintenance time) taken until the speed of rotation of the pump motor reaches the set speed, which is the target speed, with a preset second time (S520), and, after the second time passes, determines occurrence of a startup failure (S530).

Upon determining that a startup failure has occurred, the pump is stopped (S580), and then re-started. Upon restarting, the pump motor is not operated immediately but is on standby for a set period of time, and the position of the rotor is aligned after the rotor of the pump motor is stopped, and then the pump motor is started up.

In case in which the set speed is reached within the second time, the pump driving apparatus detects the direction of rotation of the pump motor to determine whether the pump motor rotates in a set direction (S550).

In case in which the pump motor rotates in a set direction, the pump driving apparatus determines that the pump motor is operating normally (S560).

Meanwhile, in case in which the pump motor rotates in the opposite direction of the set direction, the pump driving apparatus determines that a startup failure has occurred, and sets the pump motor to change the direction of rotation (S570). The pump driving apparatus stops the pump motor S580, and restarts it after a set period of time (S460 to S550).

The pump driving apparatus may control the pump to rotate in a specified direction since the drainage performance differs for each direction of rotation depending on the drainage channel of the pump. However, in the case of a pump that shows the same drainage performance regardless of the direction of rotation of the pump, it may be determined that the startup is successful regardless of the direction of rotation.

The pump driving apparatus and the laundry treatment machine including the same according to embodiments of the present disclosure are not limited to the configurations and methods of the above-described embodiments, and various modifications to the embodiments may be made by selectively combining all or some of the embodiments.

Meanwhile, a pump driving apparatus and a laundry treatment machine including the same according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A laundry treatment machine comprising:

a washing tub;

a main motor to rotate the washing tub;

a pump;

a pump motor to operate the pump;

a pump driving apparatus to drive the pump motor; and a main controller to control the pump motor to operate separately in a first period during which the pump motor stops, a second period, subsequent to the first period, during which a rotor of the pump motor is aligned, a third period, subsequent to the second period, during which a speed of rotation of the pump motor is increased with a first rising slope, a fourth period, subsequent to the third period, during which the speed of rotation of the pump motor is increased with a second rising slope steeper than the first rising slope, and a fifth period, subsequent to the fourth period, during which the speed of rotation of the pump motor is decreased and then increased again.

2. The laundry treatment machine of claim 1, wherein the main controller controls the pump motor to operate at a constant speed after the fifth period.

3. The laundry treatment machine of claim 1, wherein the pump motor is controlled to operate at constant power after the fifth period.

4. The laundry treatment machine of claim 1, wherein the first period is longer than the second period.

5. The laundry treatment machine of claim 1, wherein the first period is longer than the third period.

6. The laundry treatment machine of claim 1, wherein a sixth period is provided before the first period, during which the speed of rotation of the pump motor is decreased and stopped, wherein the sixth period is longer than the second period.

7. The laundry treatment machine of claim 6, wherein the third period is longer than the sixth period.

8. The laundry treatment machine of claim 1, wherein, in case in which the speed of rotation of the pump motor does not reach a specified speed, the main controller stops the pump motor and then starts up the pump motor.

9. A method for controlling a laundry treatment machine, the method comprising:

initiating the operation of a pump with a pump motor;

stopping the pump motor during a first period;

aligning a rotor of the pump motor during a second period;

increasing a speed of rotation of the pump motor with a first slope during a third period;

increasing the speed of rotation of the pump motor with a second slope steeper than the first slope during a fourth period;

decreasing the speed of rotation of the pump motor and then increasing again during a fifth period; and circulating or draining wash water by controlling the speed or power of the pump motor.

10. The method of claim 9, further comprising:

detecting whether the speed of rotation of the pump motor reaches a specified speed or not during the third period;

in case in which the speed of rotation of the pump motor does not reach the specified speed, determining occurrence of a startup failure and stopping the pump motor; and restarting the pump motor.

11. The method of claim 9, wherein, after the fifth period, a main controller controls the power supplied to the pump motor to be constant while a water level of a washing tub decreases.

12. The method of claim 10, wherein, during the fifth period, the output power of the pump motor decreases and then continuously increases.

13. The method of claim 10, wherein, after the fifth period, the power supplied to the pump motor is constant while a water level of a washing tub decreases.

* * * * *